United States Patent [19]

Uchiyama et al.

[11] 4,306,798
[45] Dec. 22, 1981

[54] ELECTROMAGNETICALLY DRIVEN SLIT EXPOSURE SHUTTER

[75] Inventors: Takashi Uchiyama, Yokohama; Ryoichi Suzuki; Nobuaki Date, both of Kawasaki; Yoji Sugiura, Yokohama, all of Japan

[73] Assignee: Canon Kabushiki Kaisha, Tokyo, Japan

[21] Appl. No.: 143,104

[22] Filed: Apr. 23, 1980

[30] Foreign Application Priority Data

Apr. 28, 1979 [JP] Japan ............................ 54-52619

[51] Int. Cl.³ .................... G03B 9/08; G03B 9/62; G03B 9/40
[52] U.S. Cl. ............................... 354/235; 354/51; 354/246
[58] Field of Search ................ 354/234, 235, 246, 50, 354/51, 60

[56] References Cited

U.S. PATENT DOCUMENTS

| | | | |
|---|---|---|---|
| 3,056,341 | 10/1962 | Grey | 354/50 |
| 3,148,606 | 9/1964 | Thomas et al. | 354/234 |
| 3,726,199 | 4/1973 | Alfredsson et al. | 354/234 |
| 3,744,392 | 7/1973 | Dahlgren et al. | 354/235 |
| 3,953,867 | 4/1976 | Kondo | 354/234 X |
| 3,987,473 | 10/1976 | Kondo | 354/246 X |
| 4,129,370 | 12/1978 | Ishiguro et al. | 354/51 X |

FOREIGN PATENT DOCUMENTS 2526420 12/1976 Fed. Rep. of Germany ...... 354/246

Primary Examiner—Donald A. Griffin
Attorney, Agent, or Firm—Toren, McGeady & Stanger

[57] ABSTRACT

A slit exposure shutter having the front and rear screens thereof respectively arranged to be driven by a source of an electromagnetic driving force is provided with a minimum slit width insuring means which prevents uneven exposure resulting from difference in travelling speed between the front and rear shutter screens during a high speed shutter operation and particularly prevents a total absence of the slit, the shutter is also provided with a nullifying means which nullifies the insuring means when the shutter screens are on their return travels.

13 Claims, 13 Drawing Figures

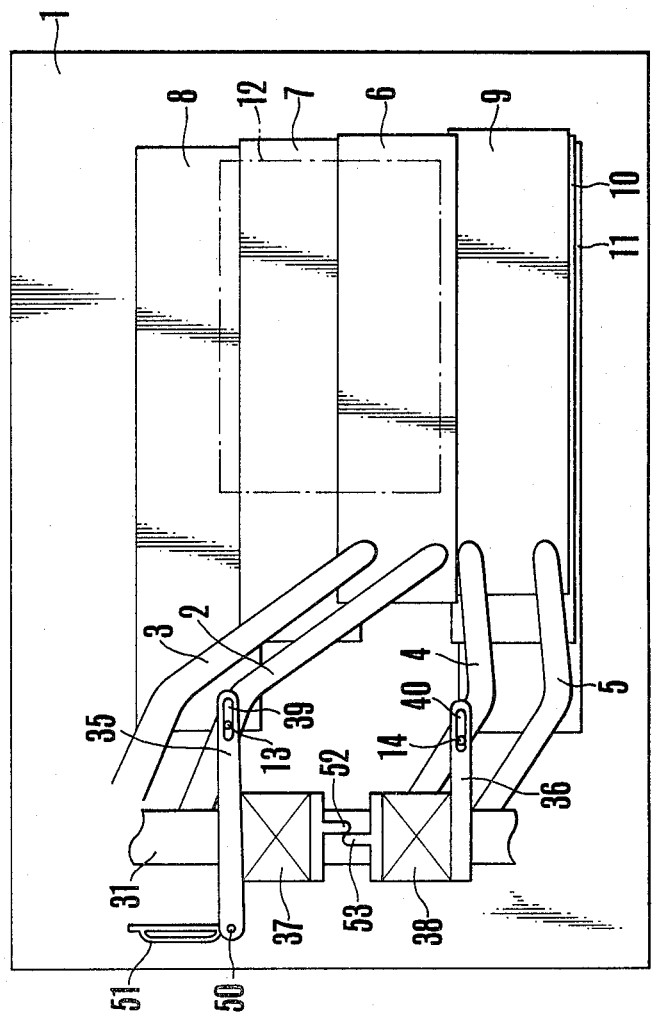

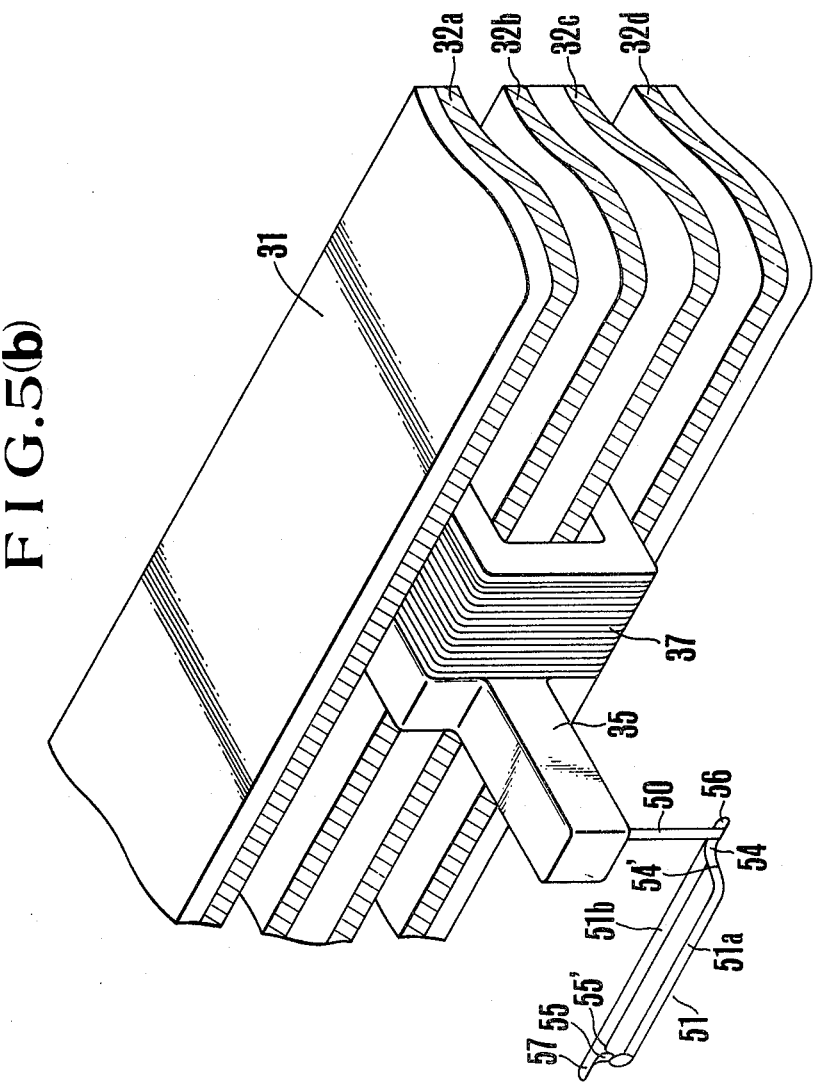

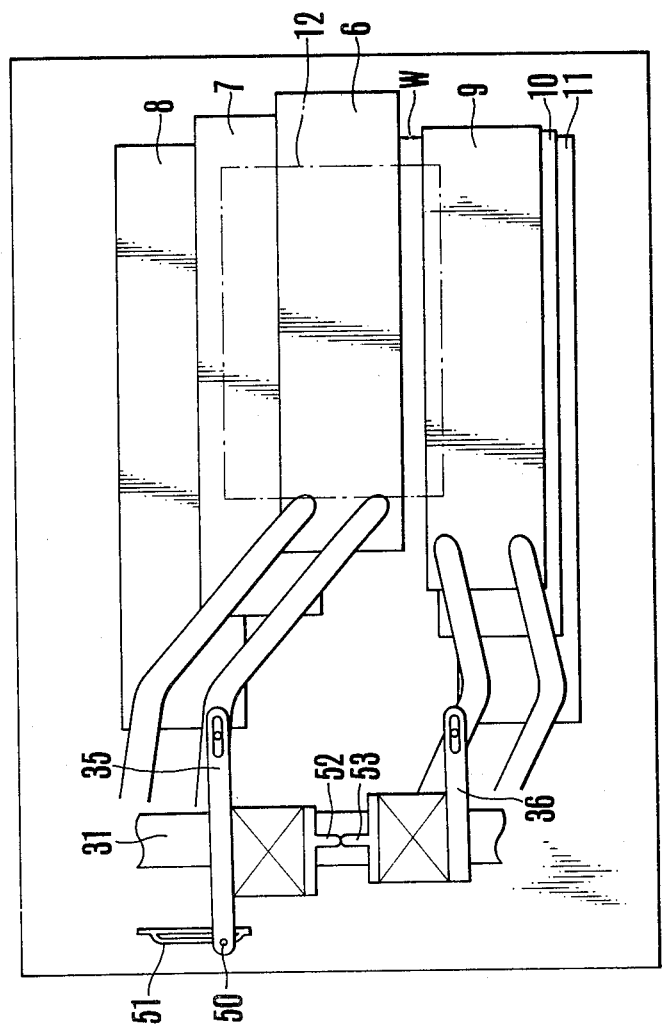

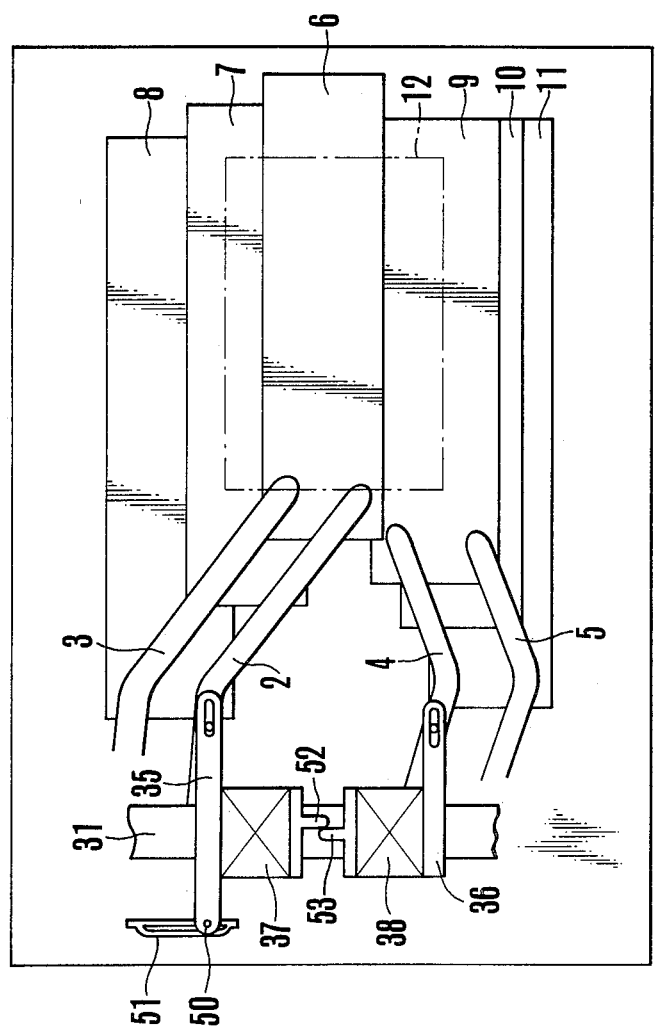

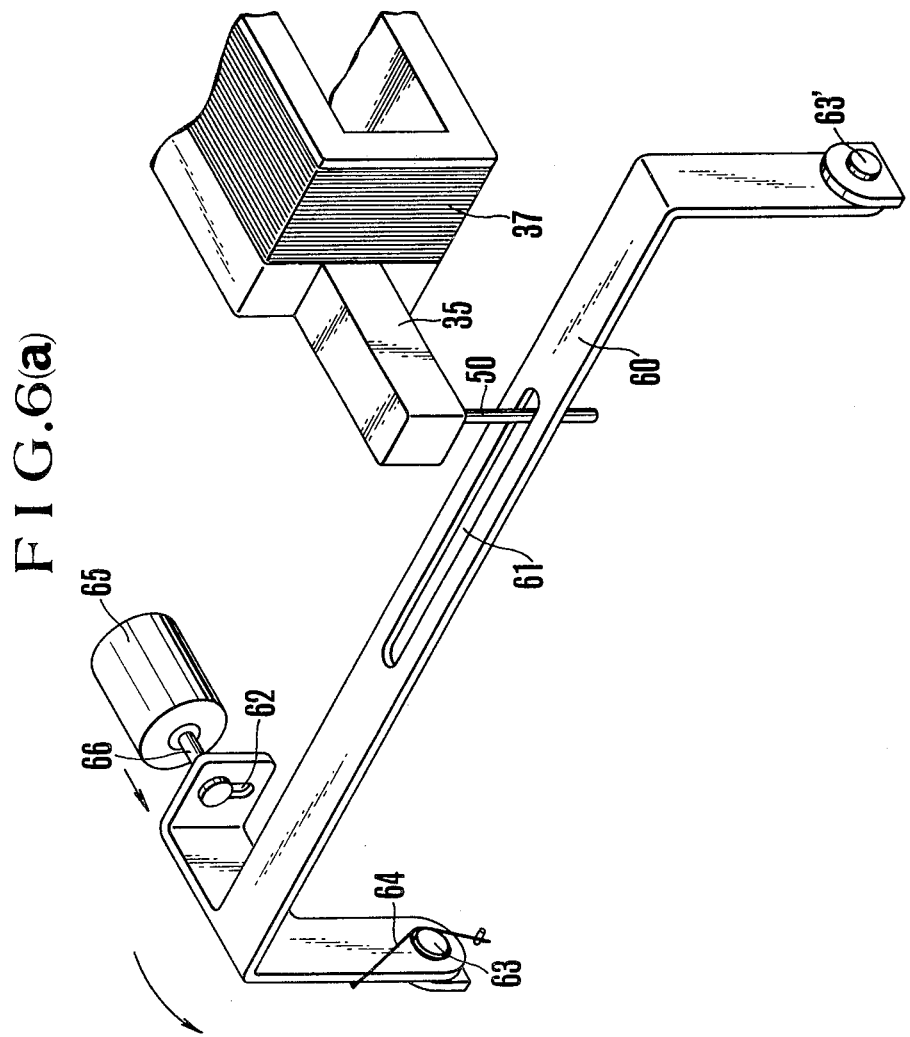

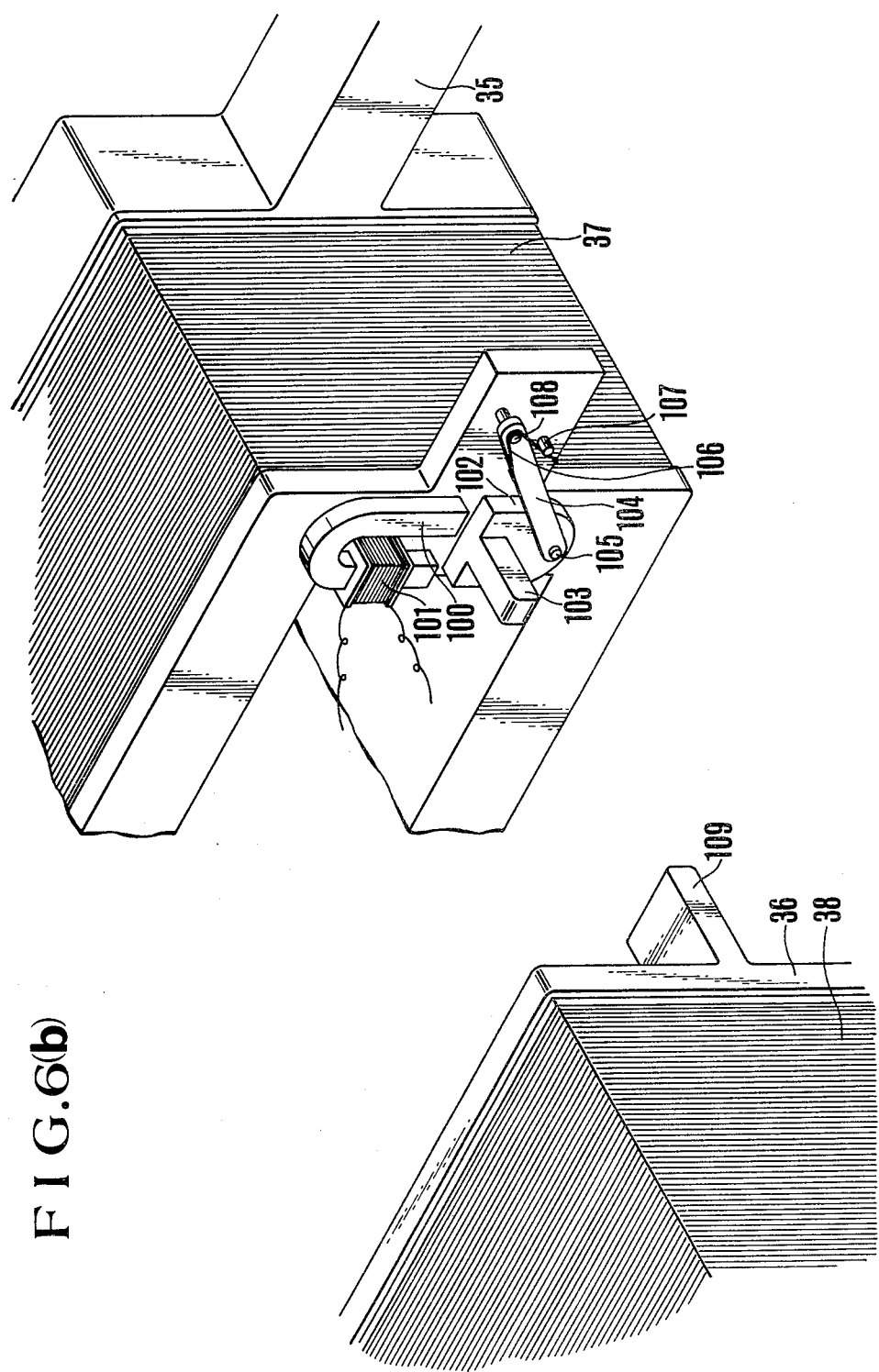

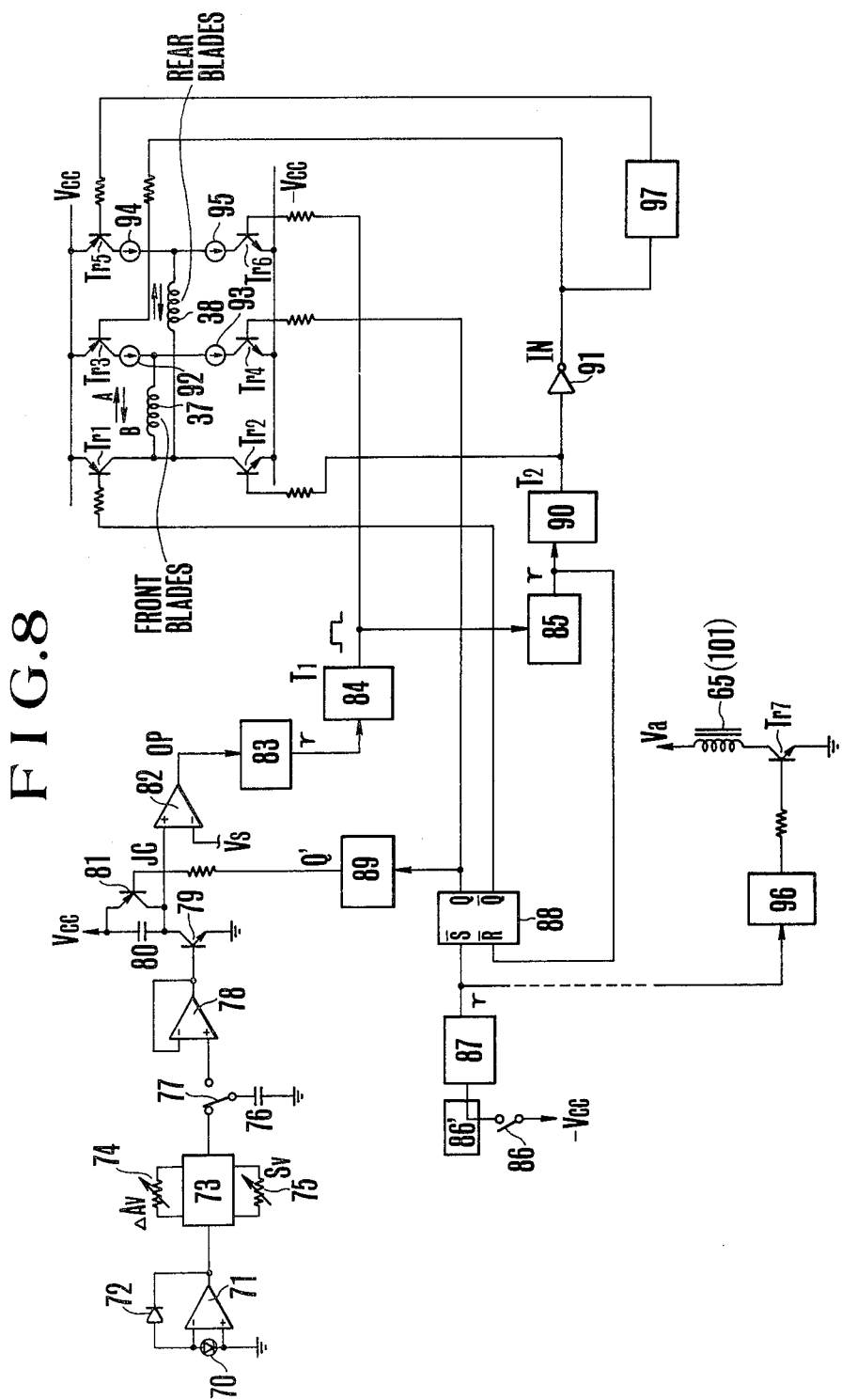

ELECTROMAGNETICALLY DRIVEN SLIT EXPOSURE SHUTTER

BACKGROUND OF THE INVENTION

1. Field of the Invention

This invention relates to a slit exposure shutter for a camera, such as a focal plane shutter, and more particularly to an improvement on a focal plane shutter of an electromagnetically driven type arranged to be operated by an electromagnetic force.

2. Description of the Prior Art

The advancement of application of electronics to cameras during recent years has resulted in the use of electronic circuits for light measurement, exposure control, information display, etc. However, in most cases, the shutter blades are still arranged to be driven by the force of a spring force which is charged by a winding up operation. Particularly, in the case of a shutter of a type requiring a relatively great driving force such as a focal plane shutter, a mechanical driving force is often employed in view of the limited capacity of the battery to be used. The focal plane shutter which is arranged to be operated by a mechanical driving force in this manner, however, must have a complex structure of the mechanism for driving the shutter screen. Such a complex structure is disadvantageous and, therefore, it has been a general desire to have an electromagnetically driven focal plane shutter having a simple structural arrangement for the driving mechanism.

Although an arrangement to drive a focal plane shutter with an electromagnetic force has been proposed in the past, a camera must be of a compact size for sufficient portability as generally known and this requirement necessitates the use of a small battery which does not have a sufficient capacity as power source for supplying a power to an electromagnetic device required for this purpose. While it is naturally more desirable that the electromagnetic device is of a large scale for a high efficiency in converting the electrical energy into a mechanical energy, the above stated requirement also necessitates the use of a small electromagnetic device which is of an inferior efficiency. Accordingly, compared with the output of the conventional mechanical, or spring type, shutter driving device, the electromagnetic shutter drive device has a small output. Besides, the use of a small battery the output of which fluctuates with temperature or the aging degree thereof causes the output of the electromagnetic device to be unstable. When a shutter screen travels, a frictional force is exerted either on the shutter screen itself or on the various parts cooperating therewith. This frictional force varies every time the shutter screen travels and also fluctuates with travelling points even within one travel.

When the front and rear screens of a focal plane shutter are driven independently of each other by means of the electromagnetic drive device which thus produces only a small and unstable output because of the above stated many reasons, the quantity of exposure light either varies every time an exposure is effected or comes to fluctuate with the points of exposure within a picture. This problem has been greatly hindering the practical applications of the conventionally known electromagnetically driven focal plane shutter.

SUMMARY OF THE INVENTION

It is a general object of the present invention to provide a focal plane shutter incorporating therein various improvements as hereinafter will be described to stabilize the operation of the focal plane shutter which heretofore has been unstable and caused uneven exposures in accordance with the conventionally known structural arrangement, so that the shutter can be used for practical applications.

As mentioned in the foregoing, unlike the mechanically driven type, the conventional electromagnetic focal plane shutter uses an unstable small battery, which results in an unstable and insufficient driving force. It is hardly possible to stabilize the travels of both the front and rear shutter screens even with utmost efforts to lighten the inertial loads, such as the shutter screens, and to uniformalize and lessen the frictional force. Then, the unstable travels of these shutter screens present the following problem: If the travelling speed of the front or rear screen of the focal plane shutter (screen speed) is caused to suddenly change during the travel due to the uneven frictional force, this might result in unevenness in the quantity of the exposure light somewhere within the picture taken. Further, even where the front and rear screens travel smoothly, if the speed of one screen is caused to vary from that of the other by some reason, such as a variation in the output of the power source battery, such a difference also might result in unevenness of the exposure light quantity somewhere in the picture thus taken. In some extreme case, such a difference in screen speed causes the rear screen to overtake the front screen on the move to completely omit a part of the picture taken from the exposure when the exposure is carried out at a high shutter speed with a narrow slit width.

This is the point in which a slit exposure shutter saliently differs from an electromagnetically driven lens shutter.

To solve this problem, in accordance with the invention, there is provided a closing-travel preventing means for preventing the slit which is formed between the rear end of the front shutter screen and the fore end of the rear shutter screen during their travels from becoming narrower than a predetermined slit width value. The provision of this closing-travel preventing means secures the minimal necessary function for the operation of an unstable electromagnetically driven focal plane shutter. Here, let us add that the arrangement to prevent the width of the slit from becoming less than a predetermined value not only simply prevents the shutter screens from travelling with the shutter closed but also serves to ensure sufficiently acceptable exposure precision over the range of the shutter speed values at which the shutter screens are supposed to travel with the width of the slit kept larger than the predetermined value.

The unevenness of the exposure light quantity due to variation in the travelling speeds of the front and rear shutter screens or due to a difference between the travelling speeds of the two most conspicuously appears in cases where the shutter screens are supposed to travel with the slit kept at a minimum width, or, in other words, at the above stated predetermined value. Assuming that the camera is manufactured to have the degree of deviation of the actual quantity of exposure light from a desired value to be within $\frac{1}{4}$ step when the shutter is operated, for example, at a maximum speed of 1/2000 sec., the degree of deviation from the desired quantity of exposure light can be held within a $\frac{1}{8}$ step at the next high speed of 1/1000 sec. Therefore, a sufficiently acceptable degree of exposure precision can be attained with some arrangement provided to stabilize the screen speed to a certain extent as mentioned in the foregoing in addition to the provision of the closing-travel preventing means.

Next, in addition to the above stated closing-travel preventing means, the shutter of the present invention is provided with a means for making the travelling speed of the rear screen somewhat higher than that of the front screen. If the travelling speed of the rear shutter screen is lower than that of the front shutter screen, the width of the slit would become wider according as it comes closer to the travelling end side of an aperture when each of the front and rear shutter screens travels at a constant speed across the aperture. This means that the exposure light quantity varies at the travel starting side of the aperture. Whereas, with the slit exposure shutter of the present invention arranged to make the travelling speed of the rear screen somewhat higher than that of the front screen in addition to the provision of the closing-travel preventing means, the width of the slit can be kept close to the predetermined value at the travel starting and ending sides of the aperture by the closing-travel preventing means. The quantity of the exposure light at the maximum shutter speed can be stabilized by this arrangement.

In accordance with the present invention, the above stated closing-travel preventing means is arranged to operate only during the exposure effecting operation of the shutter while it is arranged to be rendered inoperative during a shutter winding (or resetting) operation to preclude the possibility of winding up the front and rear screen with the slit left open between them. This arrangement, however, is of course not only necessary for an electromagnetically driven shutter but also indispensable for all types of slit exposure shutters.

The above mentioned object of the invention is attained by the following structural arrangement including: The above stated closing-travel preventing device and a reclosing means which are provided in combination with each other are formed by a displacement member and a displacement restricting member. During an exposure operation, the above stated restricting member allows the displacement member to move into a position in which the latter prevents the width of the slit from becoming less than a predetermined value. During a returning operation of shutter screens, the displacement member is moved to another position in which it can be allowed to resume the original position thereof with the slit left in a closed state. Further, these members may be attached either to the front screen system or to the rear screen system of the shutter as desired.

In accordance with the invention, the closing-travel preventing device and its reclosing means as described in the foregoing are formed by the displacement member and the displacement restricting means. Then, the restricting means is arranged to cause the displacement of the displacement member by an electromagnetic force and is controlled by energizing it to cause the displacement of the displacement member to a position in which the width of the slit is prevented from becoming less than the predetermined value during an exposure effecting operation and to another position in which the displacement member is allowed to return to its original position in a state of having the slit closed during the returning operation. In the case of the above stated electromagnetically driving arrangement, these members also may be attached either to the front screen system or to the rear screen system of the shutter.

Further, in accordance with the invention, the closing-travel preventing device is arranged to be released upon completion of the travels of the front and rear screens for effecting an exposure, so that a space required for accommodating the front screen can be lessed and the fore end of the rear screen can be allowed to overlap the frame of the aperture to a greater extent to prevent not only the leakage of light but also a reexposure which otherwise might be caused by bouncing of the shutter screens.

The closing-travel preventing device of the invention is arranged such that the fore end of the rear screen never enters the aperture under a condition in which the width of the slit required for effecting the slit exposure has become less than the predetermined value. With the displacement member being controlled by the restricting means which allows the displacement member to start the rear screen only after the front screen has travelled at least to the extent of the predetermined value.

In accordance with the invention, the shape of the displacement member of the closing-travel preventing device is suitably determined for having the above stated restricting means produce a force to push and widen the width of the slit which is formed jointly by the rear end of the front screen and the fore end of the rear screen to make it wider than the predetermined value when a driving force is imparted to a source of a rear screen driving force.

The foregoing description of the invented electromagnetically driven slit exposure shutter has covered the main structural arrangement and the advantages attainable when the shutter is arranged to have the closing-travel preventing device driven by mechanical means. However, the structural arrangement of and the advantages attainable from the shutter when it has the closing-travel preventing device electromagnetically arranged are similar to those of the mechanically driving arrangement. Further, such a closing-travel preventing device is applicable not only to an electromagnetic focal plane shutter but also to a shutter which uses a spring force as shutter driving source.

In accordance with the invention, the electromagnetic drive source required for driving the front and rear screens can be electromagnetic devices arranged separately from each other for the screens. However, it is also possible to have the yoke of these electromagnetic devices arranged in common for them for reduction in size and weight of the camera.

The electromagnetically driven slit exposure shutter of the invention is provided with a drive circuit which has the following feature: In the electromagnetic drive device of the invention, the electromagnetic coils for the front and rear screens are arranged separately from each other. On the other hand, however, the circuits which are arranged to allow a driving current to flow to each of these electromagnetic coils has a constant current circuit inserted therein. This is because, in the shutter of the invention, each of these circuits must have the constant current circuit inserted therein separately from other circuits for the reasons as described below. Meanwhile, it goes without saying that the driving system may be selected out of various types including a moving-coil type, a moving-magnet type and a moving-iron type.

As already mentioned in the foregoing, it is necessary for a camera to use a small battery which can be hardly regarded as having a sufficient capacity and an electromagnetic drive source which is small and not always has good energy converting efficiency and which thus would not give a sufficient output unless a large current is allowed to flow. Therefore, unlike the arrangement of the present invention, if a constant current circuit is not inserted in each power supply circuit and if an electromagnetically driven shutter is thus arranged without it as in the case of the conventionally known electromagnetically driven shutter, there would arise the following inconvenience:

In the accompanying drawings, FIG. 1 shows variation which takes place with time in a current flowing to the electromagnetic coil during the exposure effecting travel of a slit exposure shutter. As shown, when energization of the electromagnetic coil of the front screen begins during the exposure effecting travel, the value of the current which is an output of the battery is large only momentarily at the beginning but thereafter gradually decreases as well known as represented by a curve (1)$a$.

At a point of time t1, when energization of the electromagnetic coil for the rear screen begins with a current from the same small battery to cause the rear screen to begin its travel, the load on the battery is approximately doubled. Therefore, the value of the current to the electromagnetic coil sharply decreases as represented by another curve (1)$b$ and the value of the current to the electromagnetic coil of the rear screen comes to have different value of current from the value of current represented by the above stated curve (1)$a$ as indicated by a dotted line curve (2). Therefore, the driving force to be exerted on the front and rear screens varies with the lapse of every fraction of time in proportion to the value of the current.

FIG. 2 is an illustration of variation with time of the travelling extent which takes place during an exposure effecting operation of the slit exposure shutter shown in FIG. 1. The travelling extents of the front and rear screens which are determined by the acceleration, and therefore by the velocity, of the front and rear screens vary as shown in FIG. 2. The front screen travels as represented by a curve (1)$a$ with its acceleration decreasing gradually up to a point of time t1. The acceleration of the front screen after the point of time t1 sharply decreases and it travels as represented by a curve (1)$b$ according to the velocity obtained up to that point of time and according to an acceleration which is slightly given thereto.

Meanwhile, a power supply to the rear screen begins after the point of time t1. However, since the current value is small, the rear screen travels at a speed which is lower than the curve (1)$a$ and also lower than (1)$b$. Therefore, a shutter arranged in this manner causes different parts of a photographic film to be exposed to a light to different degrees and is thus hardly usable. Although such a shutter is usable for an exposure to be effected at a high shutter speed which allows the rear screen to start immediately after the start of the front screen because, in such a case, the current supply to the front screen nearly coincides with the current supply to the rear screen to prevent the above stated uneven exposure, the shutter that is usable only for high shutter speeds hardly serves practical purposes.

On the other hand, as indicated by curve (2)' of FIG. 1, if the shutter is arranged to have a current of about the same value as the initial value of the current supply to the front screen supplied also to the rear screen (or, instead of equalizing the current values, the arrangement of the electromagnetic device may be altered to obtain equal outputs), such arrangement is also hardly usable for practical purposes, because: Though a uniform exposure can be effected on the exposure starting side of the aperture, the degree of exposure effected on the rear side of the aperture comes to differ therefrom.

As described in the foregoing, in order to make the quantity of the exposure light (or shutter time) unvarying at every point of the aperture assuming that the inertial mass of the front screen system is equal to that of the rear screen system, a driving force exerted on the front screen after the lapse of a certain period of time after the start of the front screen and a driving force exerted on the rear screen system after the lapse of the same period of time following the start of the rear screen must be arranged to coincide with each other. Without such arrangement, it is hardly possible to prevent uneven exposure from taking place within the same picture throughout the whole range of shutter time values from a high speed to a low shutter speed.

In view of this, therefore, in accordance with the present invention, the uneven exposure within a picture is eliminated by inserting a constant current circuit in each of the current supply routes which are arranged to supply electric currents to the electromagnetic coils of the front and rear screens during their exposure effecting travels. This arrangement of the invention solves not only the above stated problem of the conventionally known electromagnetically driven focal plane shutter but also solves another problem that the full open shutter speed varies with variation in the amount of the output of the battery due to difference in the kind thereof, freshness or oldness thereof and changes in ambient temperature. In other words, a change in the properties of a battery generally causes a change in the speed of the shutter screens. However, even if the travelling speeds of both the front and rear screens are lowered, the so-called shutter time would remain unchanged if a length of time from the start of the front screen to the start of the rear screen is kept unvarying. However, with regard to a flash light photographing operation to be carried out with the focal plane shutter, a flash light must be emitted with the aperture in a full open state and, accordingly, the full-open shutter time often comes into question. However, in accordance with the present invention, power supply is effected through the constant current circuits to keep the travelling speeds of the shutter screens unvaried, so that the full-open shutter time to be used for flash light photography is always unvarying to ensure a satisfactory shutter operation.

The electromagnetically driven shutter of the present invention is prevented from having a gap between the front and rear screens when the shutter screen are on their return travels. This feature of the invention is attained by arranging the front screen to return at a higher speed than the rear screen. This arrangement can be made by using an electromagnetic drive source of any type employed and also even if a spring force is employed as driving force excerted in the direction of the exposure effecting travel. Further, this feature also can be effectively attained even in the case of a system which is not provided with the closing-travel preventing device.

In one method of attaining the above stated feature of the invention, the output of the front screen drive source is arranged to be greater than the output of the rear screen drive source with a power supplied to each of these drive sources in such a way that the travelling speeds of the front and rear screens are equal to each other during their exposure effecting travels and that the power supply to at least one of the drive sources is changed for their return travels from the power supplied on the exposure effecting travels. In another method of attaining this feature, the total inertial mass of the parts moving together with the front screen is arranged to be smaller than the total inertial mass of the parts moving together with the rear screen. Further, for the return travels, it is necessary to have the power supply circuit arranged such that the power supply to the electromagnetic drive source for the front screen begins not later than the commencement of the power supply to the electromagnetic drive source for the rear screen.

To simplify the power supply circuit for the electromagnetic coils of the invented electromagnetically driven shutter, a part of each of the power supply circuits which supply electric currents of the normal or reverse direction to the electromagnetic coils for the front and rear screens is arranged to be used in common for the front and rear screens. In addition to that arrangement, a constant current circuit is inserted in each of these power supply circuits.

Further, in accordance with the present invention, after the front and rear screens are caused to travel by electromagnetic driving forces, resetting for a next photographing operation is arranged to be done at a timing that permits stabilization of the shutter operation by allowing the power supply for return travels to begin a predetermined length of time after the start of or completion of the exposure effecting travel of the rear screen.

The above and further objects, features and advantages of the invention will be apparent from the following description of embodiments thereof taken in connection with the accompanying drawings.

BRIEF DESCRIPTION OF THE DRAWINGS

FIG. 5(a) is a schematic illustration showing by way of example, the structural arrangement of a driving device for the electromagnetically driven slit exposure shutter of the invention.

FIG. 5(b) is an enlarged oblique view showing a part of the driving device shown in FIG. 5(a).

FIG. 5(c) is a schematic illustration showing the relative positions of the parts of the shutter shown in FIG. 5(a) during its exposure effecting travel.

FIG. 5(d) is a schematic illustration showing the relative positions of the parts of the shutter shown in FIG. 5(a) during its returning travel.

FIGS. 6(a) and 6(b) are enlarged oblique views showing the driving parts of other embodiments of the invention.

FIG. 8 is a circuit diaphragm of a camera equipped with an electromagnetically driven slit exposure shutter as another embodiment of the invention.

DETAILED DESCRIPTION OF PREFERRED EMBODIMENTS

Figure 1:
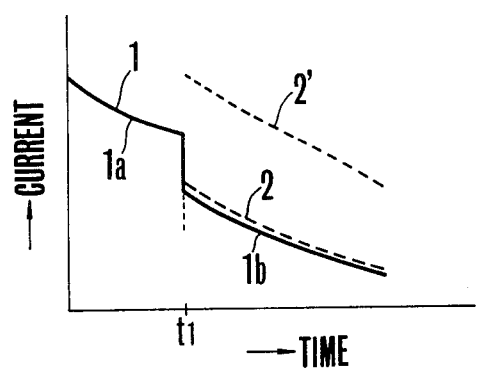
FIG. 1 is a line graph showing, by way of example, variations which take place with time in electric currents flowing to electromagnetic coils during the exposure effecting travels of the screens of a slit exposure shutter.
Figure 2:
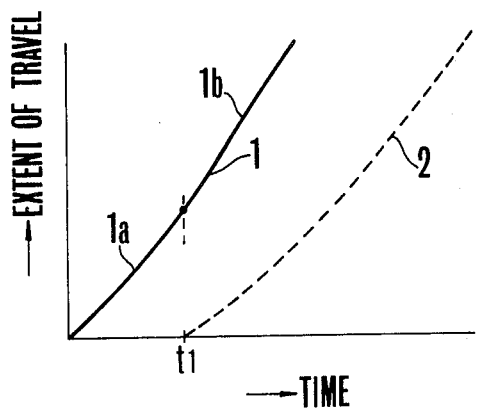
FIG. 2 is a line graph showing, by way of example, variations which take place with time in the travelling extents of the front and rear shutter screens driven by the electric currents shown in FIG. 1.
Figure 3:
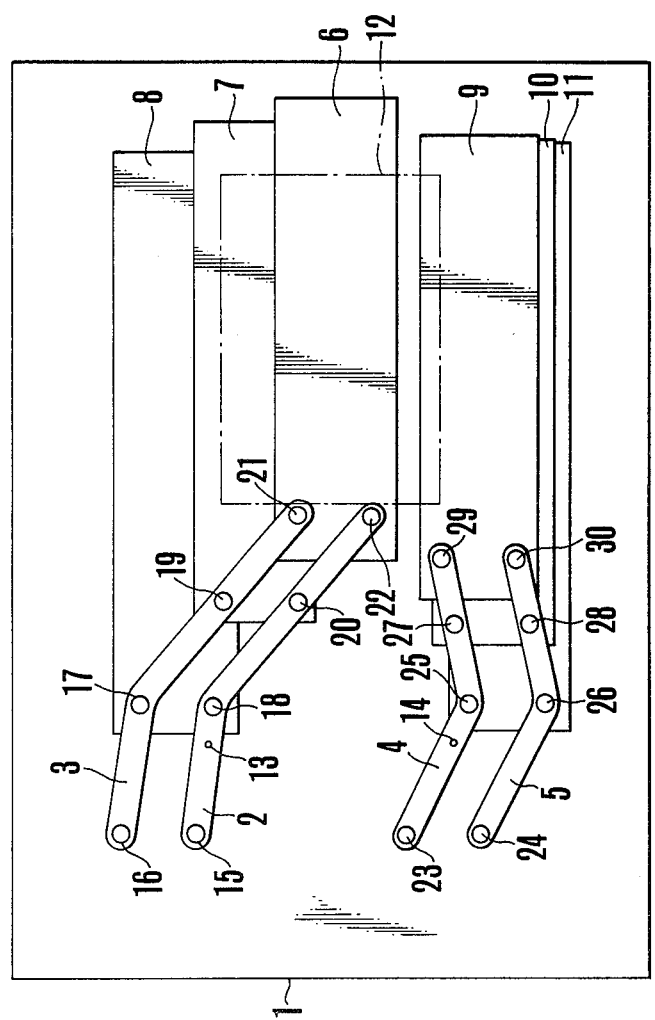
FIG. 3 is a schematic illustration of an electromagnetically driven slit exposure shutter embodying the present invention.

FIG. 3 shows the structural arrangement of an electromagnetically driven slit exposure shutter as an embodiment of the invention. As shown, this is a vertically travelling focal plane shutter having each of the front and rear screens consists of three shutter blades. In FIG. 3, a front blade driving arm 2 and an auxiliary arm 3 which are provided in combination are arranged to be rotatable respectively on shafts 15 and 16 which are secured to a base plate 1. A rear blade driving arm 4 and an auxiliary arm 5 which are provided in combination are also arranged to be rotatable respectively on shafts 23 and 24 which are secured to the base plate 1. There are provided front shutter blades 6, 7 and 8 which are rotatably attached to the above stated front blade arm 2 and the auxiliary arm 3 by means of shafts 21, 22, 19, 20, 17 and 18. Meanwhile, rear shutter blades 9, 10 and 11 are also rotatably attached to the above stated rear blade arm 4 and the auxiliary arm 5 by shafts 29, 30, 27, 28, 25 and 26. The front and rear blade arms 2 and 4 are provided with pins 13 and 14 which are secured perpendicularly to these arms and are arranged to engage with slots provided in the bobbins of a linear motor which will be described hereinafter. A reference numeral 12 indicates the aperture of the shutter. FIG. 3 shows the positions of these parts of the shutter as in a slit exposure effecting action.

Figure 4:
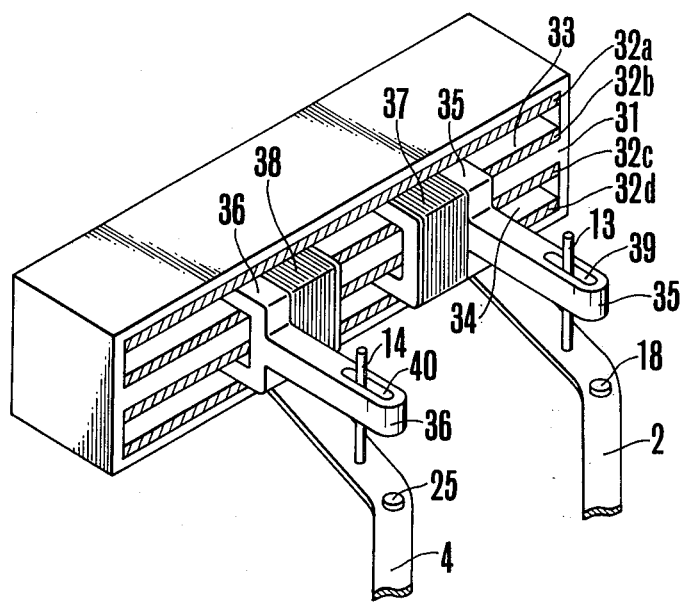
FIG. 4 is an oblique view showing by way of example the structure of a linear motor to be used for the shutter shown in FIG. 3.

FIG. 4 is an oblique view showing a linear motor used for this embodiment. The linear motor comprises a yoke; flat-shaped permanent magnets 32a–32d which are secured to the inside of the yoke; gaps 33 and 34 which are formed between the permanent magnets 32a and 32b and between the permanent magnets 32c and 32d and are arranged to cause the permanent magnets to produce vertical magnetic fluxes within these gaps; bobbins 35 and 36 which are inserted in the gaps 33 and 34; coils 37 and 38 which are wound round these bobbins 35 and 36; and slots 39 and 40 which are formed in the bobbins 35 and 36.

The numerals 2 and 4 in FIG. 4 respectively indicate the front and rear blade driving arms shown in FIG. 3; and 13 and 14 indicate the pins which are perpendicularly secured to these driving arms and are arranged to engage respectively with the above stated slots 39 and 40 as illustrated. The linear motor shown in FIG. 4 operates as described below:

When the coils 37 and 38 are energized, interactions which take place between the currents supplied to these coils 37 and 38 and the magnetic fluxes vertically produced within the gaps 33 and 34 cause the bobbins 35 and 36 to move to the left or right. This in turn causes the front and rear blade driving arms 2 and 4 to rotate clockwise or counterclockwise on the shafts 15 and 23 shown in FIG. 3 and, accordingly, there takes place a sliding movement of the shutter blades.

FIG. 5 and drawings subsequent thereto show the subject matters of the invention including the closing-travel preventing mechanism (or a minimum slit width insuring mechanism) which is provided for preventing the slit from being closed during the travel of the shutter and the reclosing mechanism (or an opening preventing mechanism) which operates when the shutter is to be reset.

FIG. 5(a) shows the engagement of the focal plane shutter shown in FIG. 3 with the linear motor shown in FIG. 4 and the shutter as in a state of having been set with the aperture 12 closed by the front blades 6, 7 and 8. In FIG. 5(a), the same reference numerals indicate the same parts as those shown in FIGS. 3 and 4. Therefore, description of these same parts is omitted here. A numeral 50 indicates a pin which is attached to the bobbin 35 and extends perpendicularly downward; 51 indicates a groove arrangement which is arranged to engage the pin 50; and 52 and 53 indicate protrudent parts provided on the bobbins 35 and 36. The details of the arrangement of the pin 50 and the groove arrangement 51 are as shown in FIG. 5(b). Referring to FIG. 5(b), the groove arrangement 51 consists of two long grooves 51a and 51b which are disposed in parallel with each other and are arranged to be connected to each other at both ends of them. The two end parts of the pair of long grooves 51a and 51b are divided by two plate springs 54 and 55 while the sides 54' and 55' of these plate springs 54 and 55 are fixed.

When the shutter travels with the bobbin 35 sliding upward after commencement of power supply to the coil 37 in the condition as shown in FIG. 5(a), the plate spring 54 hinders the pin 50 from moving to the long groove 51b shown in FIG. 5(b). This causes the pin 50 to travel inside of the long groove 51a. Therefore, as shown in FIG. 5(c), the bobbin 35 slides upward in a state of being deflected somewhat to the left. Therefore, the protrudent parts 52 and 53 of the bobbins 35 and 36 come to abut on each other as shown. Then, the bobbins 35 and 36 are slided keeping between them at least a predetermined distance thus defined by the protrudent parts 52 and 53. Accordingly, the front and rear blades 6 and 9 are caused to travel ensuring a slit width W between them as shown in FIG. 5(c).

When the bobbin 35 further slides upward, the pin 50 pushes the plate spring 55 away and reaches the fore end part 57 of the long groove to complete the sliding movement. This in turn brings the movement of the front blades also to an end. Upon completion of the movement, since the pin 50 reaches the fore end part 57 of the long groove, the protrudent parts of the bobbins 35 and 36 disengage from each other to have the front and rear shutter blades no longer form the slit of the width W. Further, in the case of this embodiment, the coils 37 and 38 are arranged to be continuously energized even after completion of the travel of the shutter to prevent the shutter blades from falling down by their own weights.

The operation of the shutter for resetting the shutter blades is as follows: The currents flowing to the coils 37 and 38 are reversed to cause the bobbins 35 and 36 to slide downward. Then, the pin 50 which is erected on the bobbin 35 is prevented by the plate spring 55 from entering the long groove 51a and comes to slide within the other long groove 51b. Therefore, as shown in FIG. 5(d), the bobbin 35 this time is not deflected sidewise but slides straightly downward and thus without bringing the protrudent parts 52 and 53 into contact with each other. The coil 37 is arranged to receive a greater power supply than the coil 38 and thus the bobbin 35 produces a greater output than the bobbin 36. Therefore, the rear shutter blade 9 moves while being pushed by the front shutter blade 6, so that the shutter can be reset while it is completely closed. In this particular embodiment, the minimum slit width is ensured during the shutter travel and the shutter is prevented from opening during the shutter resetting operation by the groove arrangement 51 and the actions of the protrudent parts 52 and 53 of the bobbins. However, the same function can be also performed by a different arrangement employed in another embodiment which is shown in FIG. 6.

In FIG. 6(a), numerals 35, 37 and 50 indicates the same bobbin, the same coil and the same perpendicular pin mounted on the bobbin as those described in the foregoing. There is provided a lever 60 which is rotatable on shafts 63 and 63' and is provided with a slot 62 and a long slot 61. The long slot 61 is arranged to engage the pin 50. The lever 60 is constantly urged to rotate clockwise by a helical spring 64. There is provided a plunger motor 65 which is provided with an output shaft 66. The output shaft 66 of the plunger motor 65 engages the above stated slot 62 and is arranged such that, when the output shaft 66 is caused to come forward by an urging action of a member which is not shown, the lever 60 overcomes the urging force of the spring 64 and rotates counterclockwise to a predetermined degree.

For a travelling operation of the shutter, if the plunger motor is urged beforehand to have the lever 60 rotated to a predetermined angle, the bobbin 35 moves a predetermined distance to the left through the engagement of the pin 50 with the long slot 61 and thus comes to slide upward. In resetting the shutter, if the plunger motor 65 is released from urging, the lever 60 is brought back to its original position by the urging force of the spring 64 and thus comes to slide straightly downward. During the shutter travelling operation, the protrudent parts 52 and 53 of the bobbins shown in FIG. 3 engages with each other to ensure the minimum slit width. However, they do not engage with each other during the shutter resetting operation to prevent the shutter from opening then.

Next, FIG. 6(b) shows a further example of arrangement to ensure the minimum slit width during the travelling operation of the shutter and to prevent the shutter from opening during the shutter resetting operation. In FIG. 6(b), a yoke 100 and a coil 101 of an electromagnet are secured to the above stated bobbin 35. There are provided an armature 102 which has a protrudent part 103; a lever 104 which is rotatable on a shaft 108, one end of the lever 104 being rotatably connected to the armature through a shaft 105; and a helical spring 106 which is arranged to constantly urge the above stated lever 104 to rotate clockwise. The bobbin 36 is provided with a protrudent part 109. The embodiment arranged as described above operates in the following manner:

In the shutter travelling operation, when the coil 101 of the electromagnet is energized, the armature 102 overcomes the urging force of the helical spring 106 and is thus attracted by the yoke 100 of the electromagnet. Then, the protrudent part 103 of the armature and that 109 of the bobbin 36 come to engage with each other. Bobbins 35 and 36 then travel keeping a predetermined distance between them, so that the shutter slit can be kept having at least a predetermined width. In resetting the shutter, when power supply to the coil 101 is cut off, the urging force of the spring 106 causes the armature 102 to move downward and the protrudent part 103 of the armature and the protrudent part 109 of the bobbin do not engage with each other this time. During the resetting operation, therefore, the shutter is completely closed.

The fore ends of the protrudent parts of the bobbins 35 and 36 which are arranged to ensure the minimum slit width during the shutter travelling operation are rounded to permit the protrudent part 52 to forcedly ride on the protrudent part 53 by a lateral sliding movement of the bobbin 35 even when the bobbins 35 and 36 simultaneously begin to travel, so that the minimum slit width can be ensured in a condition as shown in FIG. 5(c).

Figure 7A:
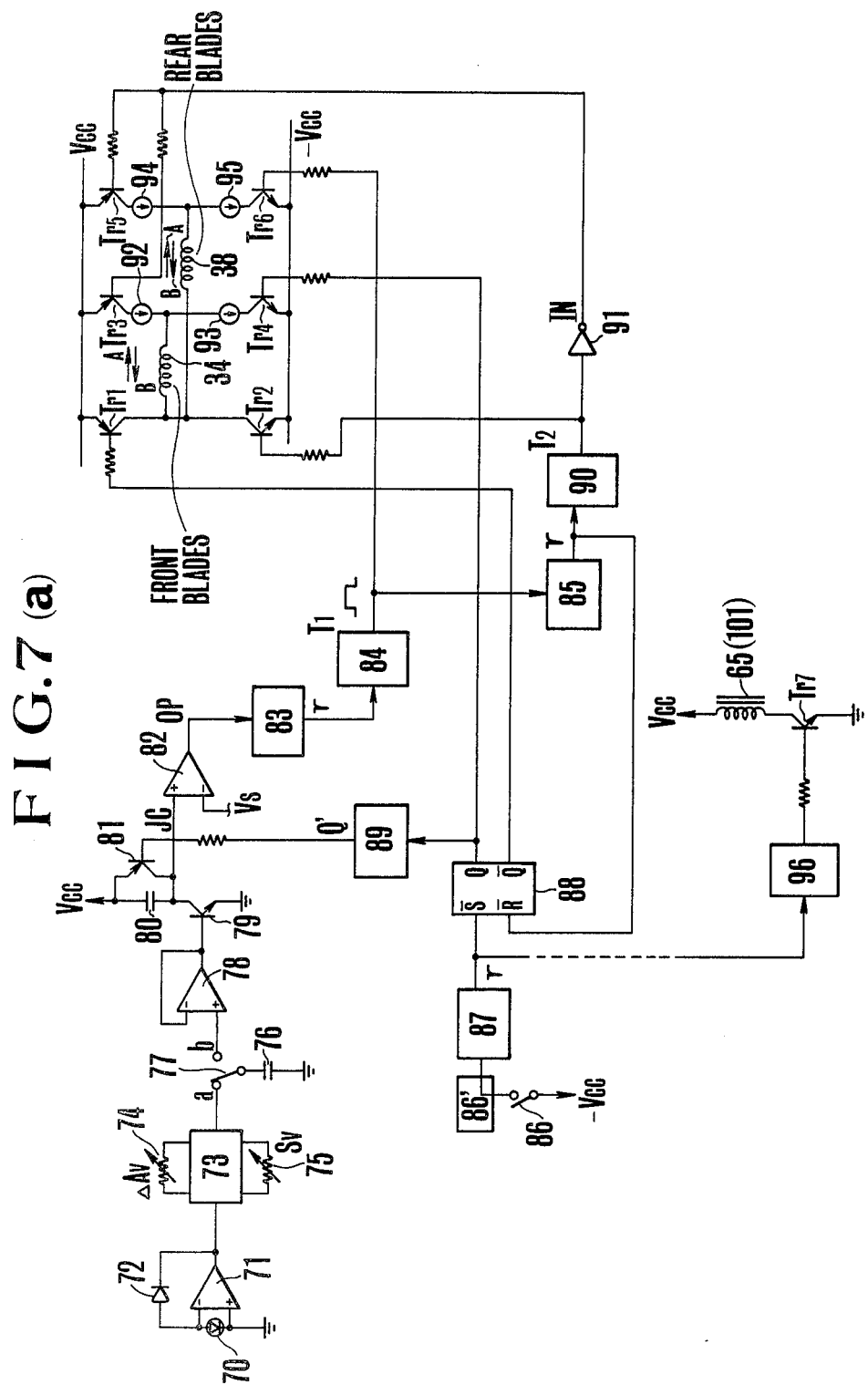
FIG. 7(a) is a circuit diagram showing by way of example, the circuit of a camera which is equipped with the electromagnetically driven slit exposure shutter of the invention.

A driving circuit for the linear motor employed in the embodiments described in the foregoing is as illustrated in FIG. 7(a). This circuit is designed for use in a single-lens reflex camera of a full-open TTL light measurement, aperture-preference and automatic exposure type. In FIG. 7(a), there are provided a photogalvanic element SPC70 which receives a transmission light coming from a photograph taking lens; an operational amplifier 71 (hereinafter will be called OP amplifier for short) which has its two input terminals connected to the above stated element 70 and has a diode 72 for logarithmic suppression connection to its negative feedback route; a known computation circuit 73; a variable resistor 74 for setting information on the number of stopped down steps ($\Delta AV$) of a preset aperture; and a variable resistor 75 for setting the ASA sensitivity information on the film to be used. The above stated computation circuit 73 is arranged to produce information TV on the number of steps of the shutter time to be controlled. A numeral 76 indicates a capacitor for storing the information TV; 77 indicates a change-over switch which is normally connected to a contact a and is arranged to shift the connection to another contact b in response to the commencement of the upward movement of a quick-return mirror; 78 indicates an OP amplifier which forms a voltage follower; 79 indicates a transistor for logarithmic extension, the collector of the transistor 79 being connected to a time constant capacitor 80; 81 indicates a switching transistor provided for starting count; 82 indicates an OP amplifier which forms a comparison circuit and has its non-inversion input terminal connected to the collector terminal of the above stated logarithmically extending transistor 79 and its inversion input terminal arranged to have a reference voltage Vs impressed thereon; 83 indicates a differentiation circuit which is connected to the output terminal of the comparison circuit 82; 84 indicates a timer circuit which is arranged to be triggered by a negative differentiation pulse of the differentiation circuit 83 and is arranged to retain its output at a high level for a predetermined length of time, 20 mS for example; 85 indicates a differentiation circuit which is connected to the output terminal of the timer circuit 84; 86 indicates an ordinary switch which is arranged to close in response to completion of the upward movement of the quick-return mirror, the switch 86 being arranged such that the closure of the switch causes a differentiation circuit 87 which is disposed at the next stage to produce negative differentiation pulses; 88 indicates a flip-flop circuit which has its set input terminal connected to the output terminal of the above stated differentiation circuit 87 and also has a delay circuit 89 connected to its output terminal Q, the output terminal Q' of this delay circuit 89 being connected through a resistor to the base of the switching transistor 81 which is provided for starting count; and 90 indicates a timer circuit which is connected to the output terminal of the above stated differentiation circuit 85 and is arranged to be triggered by a negative differentiation pulse of the differentiation circuit 85 to keep its output at a high level for a predetermined length of time, such as 20 mS. The timer circuit 90 has an inversion circuit 91 connected to the output terminal thereof. There are provided switching transistors Tr1–Tr6, which are disposed in a bridge arrangement as illustrated; a coil 37 which is provided for the purpose of driving the front shutter blades as shown in FIG. 4; and another coil 38 which is provided for driving the rear shutter blades. The coil 37 is connected between the collector of the switching transistor Tr1 (Tr2) and the collector of the switching transistor Tr3 (Tr4) while the coil 38 is connected between the collector of the switching transistor Tr1 (Tr2) and the collector of the switching transistor Tr5 (Tr6). In the drawing, an arrow mark A indicates the direction in which a current flows for a shutter travelling operation and another error mark B the direction in which a current flows for resetting the shutter. The base of the switching transistors Tr1 is connected through a resistor to the output terminal $\overline{Q}$ of the above stated RS flip-flop circuit 88; that of the switching transistor Tr2 is connected through a resistor to the output terminal T2 of the above stated timer circuit 90; the bases of the transistors Tr3 and Tr5 are connected through a resistor to the output terminal IN of the above stated inversion circuit 91; the base of the transistor Tr4 is connected through a resistor to the output Q of the RS flip-flop circuit 88; and the base of the transistor Tr6 is connected through a resistor to the output terminal T1 of the above stated timer circuit 84.

Each of these switching transistors Tr3–Tr6 has a constant current circuit 92, 93, 94 or 95 connected to the collector terminal thereof. These constant current circuits 92–95 are arranged for flowing constant current to the front and rear blade driving coils 37 and 38 in the normal and reverse directions respectively. Further, the output current of the constant current circuit 94 is arranged to be smaller than the output current of the constant current circuit 92.

Figure 7B:
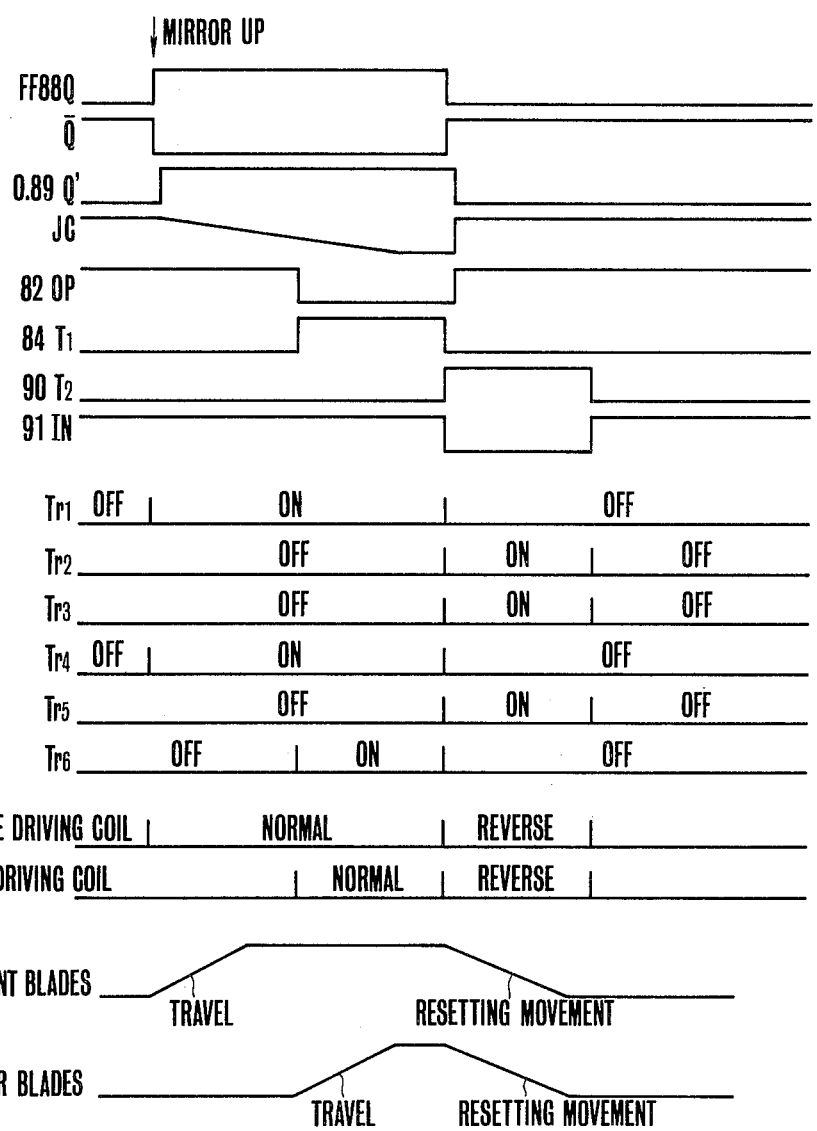
FIG. 7(b) is a timing chart showing the operation of the circuit shown in FIG. 7(a).

The operation of the circuit arrangement described in the foregoing will be understood from the following description based on the timing chart shown in FIG. 7(b):

At the OP amplifier 71 (SPC head amp.), there are produced voltages corresponding to the brightness value Bv of an object to be photographed and corresponding to the full-open F number value Aro of the photograph taking lens in use. The voltage output thus obtained is then computed at the next stage by the computation circuit 73 together with the information on the number of presetting stopped down steps $\Delta AV$ and the information on the ASA sensitivity of the film to be used. Then the output terminal of the computation circuit 73 produces a voltage that corresponds to the information on the shutter time value TV to which the shutter speed should be controlled. This voltage is then stored at the storing capacitor 76.

Following this, when a shutter release operation is performed, the quick return mirror is caused by a means which is not shown to begin its upward movement. Then, the above stated change-over switch 77 comes to connect with the contact b. Therefore, the voltage stored at the storing capacitor 76 is produced by the output terminal of the OP amplifier 78. Upon completion of the upward movement of the quick-return mirror, the switch 86 closes; a negative differentiation pulse is produced from the output terminal of the differentiation circuit 87; then, the RS flip-flop circuit 88 is set by the pulse; and the outputs Q and $\overline{Q}$ of the flip-flop circuit 88 change to high and low levels as shown in FIG. 7(b).

This causes the switching transistors Tr1 and Tr4 to turn on. A constant current defined by the constant current circuit 93 then flows to the front blade driving coil 37 in the direction of the arrow mark A and the front shutter blades begin to travel.

The output $\overline{Q}$ of the delay circuit 89 comes to have a high level a little later than the changing to high level of the output Q of the flip-flop circuit 88 and this causes the switching transistor 81 to turn off. This delaying action of the delay circuit 89 serves to compensate for a delay of the start of an exposure after the commencement of the travel of the front shutter blades. The time constant capacitor 80 comes to be charged by a current obtained by logarithmic extension of the output voltage of the above stated OP amplifier and the terminal level voltage JC thereof decreases as shown in FIG. 7(b).

When this voltage JC becomes lower than the inversion input voltage Vs of the OP amplifier 82 which forms a comparison circuit, the output OP of the OP amplifier changes to a low level. The differentiation circuit 83 which is disposed at the next stage then produces a negative differentiation pulse, which triggers the timer 84 to have the output T1 thereof kept at a high level for a predetermined period of time, say, 20 mS. When the level of the output T1 of the timer comes to have a high level, the switching transistor Tr6 is turned on. Then, since the switching transistor Tr1 has been turned on as mentioned in the foregoing, a constant current defined by the constant current circuit 95 begins to flow to the rear shutter blade driving coil 38 in the direction of the arrow mark A and the rear shutter blades begin to travel.

The length of time for which the output T1 of the timer 84 is kept at the high level is preset to be somewhat longer than a length of time required for completion of the travel of the rear shutter blades to ensure the completion of the travel of the rear shutter blades.

When the output T1 of the timer 84 returns to a low level, the differentiation circuit 85 in the next stage produces a negative differential pulse, which resets the above stated RS flip-flop circuit 88 to change the outputs Q and $\overline{Q}$ thereof to low and high levels respectively. Since the output T1 of the timer 84 is at a low level, the switching transistors Tr1, Tr4 and Tr6 are turned off. Further, the negative differentiation pulse from the differentiation circuit 85 triggers the timer 90 in the next stage to keep the output T2 thereof at a high level for a predetermined length of time, say, 20 mS. In the meantime, the output IN of the inversion circuit 91 in the next stage is kept at a low level.

During this period, therefore, the switching transistors Tr2, Tr3 and Tr5 are turned on and constant currents defined by the constant current circuits 92 and 94 flow to the front and rear shutter blade driving coils 37 and 38 in the direction of the arrow mark B to cause the front and rear shutter blades begin their resetting movements. The length of time for which the output T2 of the above stated timer circuit 90 is kept at a high level is preset to be somewhat longer than a length of time required for completion of resetting of the front and rear shutter blades to ensure completion of the resetting movements. Further, as mentioned in the foregoing, the output current of the constant current circuit 94 is set to be smaller than that of the constant current circuit 92. Therefore, the current supplied to the front blade driving coil 37 is larger than the current supplied to the rear blade driving coil. This makes the force of the resetting movement of the front blades larger than that of the rear blades. Accordingly, the resetting movement of the rear blades is performed while the rear blades are being pushed by the front blades. In this manner, the shutter is effectively prevented from making its resetting movement in an open state. Furthermore, the amount of current supply to the rear blade driving coil 38 by the constant current circuit 95 during the travelling operation of the shutter is preset to be somewhat larger than the amount of current supply to the front blade driving coil 37 by the other constant current circuit 93.

In accordance with the circuit arrangement as described in the foregoing, the front shutter blades are prevented from falling down by their own weights as the front blade driving coil continuous to receive the current supply even after completion of the travel of the front shutter blades. The resetting movements of the shutter blades are allowed to take place with some time interval after completion of the travel of the rear shutter blades.

Next, FIG. 7(a) shows also the driving part of the minimum slit width insuring mechanism which insures the minimum slit width during the travelling operation of the shutter with the plunger 65 and the electromagnet which are shown in FIG. 6(a) and FIG. 6(b) employed for this mechanism. In FIG. 7(a), a timer circuit 96 is connected to the output terminal of the above stated differentiation circuit 87. The negative differentiation pulse which is produced from this differentiation circuit triggers the timer circuit 96 to keep the output thereof at a high level for a predetermined period of time, say, about 20 mS. During this period, a transistor Tr7 turns on to effect current supply to the coil of the plunger 65 or the coil 101 of the electromagnet for a predetermined period. This current supply period is preset to be longer than a length of time required for completion of the travel of the front shutter blades. The arrangement is such that, under a travel completed condition, the current supply to the plunger 65 or to the electromagnet is cut off and the protrudent parts 52 and 53 of the bobbins 35 and 36 disengage from each other.

In the circuit arrangement shown in FIG. 8, there is provided a function that, during a shutter resetting operation, the starting time of the current supply to the rear shutter blade driving coil 38 is delayed and arranged to be somewhat later than that of the current supply to the front shutter blade driving coil 37, so that the shutter can be closed without fail during the shutter resetting operation. The circuit arrangement is characterized by the addition of a delay circuit 97. With the exception of that, other parts of the circuit arrangement are identical with those of the one shown in FIG. 7(a). Therefore, the structural arrangement and the operation of the circuit arrangement shown in FIG. 8 are omitted from description herein.

In the embodiment described in the foregoing, the minimum slit width insuring mechanism is disposed at the bobbin 35 which is provided for driving the front shutter blades. However, instead of the bobbin 35, this can be disposed at the other bobbin 36 which is provided for driving the rear shutter blades.

Further, in the embodiment, each coil is arranged to be driven by a constant current circuit. The purpose of this arrangement is to stabilize the travel characteristic of each shutter blade and to prevent unevenness thereof.

After the shutter is reset in the embodiment, the shutter blades and the driving arms may be locked by some suitable known means. With such locking arrangement, exposures by some erroneous operations other than a shutter release operation can be effectively prevented.

As described in detail through embodiment examples in the foregoing, the electromagnetically driven slit exposure shutter of the present invention prevents the unstable operation that tends to result from a high shutter speed operation of a shutter of this type and unreliable travels of the shutter blades that tend to take place during resetting thereof even where a small battery of insufficient capacity or a battery which somewhat has been deteriorated is employed as power source. A reliable and stable shutter operation can be performed even with a compact electromagnetic device which is inferior in efficiency.

The present invention is therefore highly advantageous in the manufacture of a compact, light weight camera of the type using an electromagnetically driven shutter. While preferred embodiments of the invention have been described, such description is for illustrative purposes only. It is to be understood that, as already mentioned in different parts of the foregoing description, changes and variations may be made without departing from the spirit or scope of the invention.

What is claimed is:

1. An electromagnetically driven slit exposure shutter for a camera, comprising:
   a front shutter screen which is arranged to travel when it is driven by an electromagnetic drive source;
   a rear shutter screen which travels when it is driven by another electromagnetic drive source and is arranged to form a slit for effecting an exposure between it and said front shutter screen;
   a closing-travel preventing device which is arranged to keep the width of said slit formed between said front and rear shutter screens at a value larger than a predetermined value;
   means for nullifying said closing-travel preventing device to prevent the formation of said slit when said front and rear shutter screens are on their return travels;
   said closing-travel preventing device including a displacement member which travels together with said front or rear shutter screen and also including restricting means, which, for an exposure effecting travel operation of the shutter, controls said displacement member to have the displacement member moved to a position in which the width of said slit is kept above said predetermined value and, for the return travels of said front and rear shutter screens, controls said displacement member to have it moved to another position in which said front and rear shutter screens are not allowed to form any slit between them.

2. A shutter according to claim 1 further including an electromagnetic means for controlling said displacement member and said restricting means.

3. A shutter according to claim 1 wherein said front shutter screen is arranged to travel at about the same speed as or somewhat slower speed than said rear shutter screen during an exposure effecting operation of the shutter.

4. A shutter according to claim 1 further including a means for rendering said closing-travel preventing device inoperative in the vicinity of the end of the travel of said front shutter screen.

5. A shutter according to claim 1 further including a means for actuating said closing-travel preventing device concurrently with the commencement of an exposure effecting action of said front shutter screen.

6. A shutter according to claim 1 further including electromagnetic coils for driving said front and rear shutter screens; and power supply circuits for supplying driving currents to said electromagnetic coils in the normal and reverse directions, said power supply circuits including constant current circuits to cause said electromagnetic coils to drive said front and rear shutter screens with constant driving force respectively.

7. A shutter according to claim 6, further comprising a front screen driving circuit, a rear screen driving circuit, a time constant circuit arranged to begin to operate concurrently with said front screen driving circuit, and a delay circuit; said rear screen driving circuit is arranged to be actuated by the output of said time constant circuit; and the time of power supply to said rear screen driving electromagnetic coil is adjustable by adjusting the delay time of said delay circuit.

8. A shutter according to claim 6, wherein said front and rear screen driving electromagnetic coils include a common magnetic circuit.

9. A shutter according to claim 6 wherein the power supply circuit of said front screen driving electromagnetic coil and that of said rear screen driving electromagnetic coil have a part of them in common.

10. An electromagnetically driven slit exposure shutter for a camera, comprising:
   a front shutter screen which is arranged to travel when it is driven by an electromagnetic drive source;
   a rear shutter screen which travels when it is driven by another electromagnetic drive source and is arranged to form a slit for effecting an exposure between it and said front shutter screen;
   a closing-travel preventing device which is arranged to keep the width of said slit formed between said front and rear shutter screens at a value larger than a predetermined value;
   means for nullifying said closing-travel preventing device to prevent the formation of said slit when said front and rear shutter screens are on their return travels;
   electromagnetic coils for driving said front and rear shutter screens;
   power supply circuits for supplying driving currents to said electromagnetic coils in the normal and reverse directions, said power supply circuits including constant current circuits to cause said electromagnetic coils to drive said front and rear shutter screens with a constant driving force respectively;
   means for supplying said front screen driving electromagnetic coil with a greater driving current than said rear screen driving electromagnetic coil during the return travels of said front and rear shutter screens.

11. A shutter according to claim 10, further including a means for delaying somewhat the starting time of power supply to said rear screen driving electromagnetic coil to make it somewhat later than the starting time of power supply to said front screen driving electromagnetic coil at the time of the return travels of said front and rear shutter screens.

12. An electromagnetically driven slit exposure shutter for a camera, comprising:
- a front shutter screen which is arranged to travel when it is driven by an electromagnetic drive source;
- a rear shutter screen which travels when it is driven by another electromagnetic drive source and is arranged to form a slit for effecting an exposure between it and said front shutter screen;
- a closing-travel preventing device which is arranged to keep the width of said slit formed between said front and rear shutter screens at a value larger than a predetermined value;
- means for nullifying said closing-travel preventing device to prevent the formation of said slit when said front and rear shutter screens are on their return travels;
- electromagnetic coils for driving said front and rear shutter screens;
- power supply circuits for supplying driving currents to said electromagnetic coils to the normal and reverse directions, said power supply circuits including constant current circuits to cause said electromagnetic coils to drive said front and rear shutter screens with a constant driving force respectively;
- means for delaying somewhat the starting time of the power supply to said rear screen driving electromagnetic coil to make it somewhat later than the starting time of the power supply to said front screen driving electromagnetic coil at the time of the return travels of said front and rear shutter screens.

13. An electromagnetically driven slit exposure shutter comprising:
- a front shutter screen driven by an electromagnetic driving source;
- a rear shutter screen driven by an electromagnetic driving source and forming a slit for exposure between the front shutter screen and the rear shutter screen;
- a displacement member which runs along a constant path with one of the front and rear shutter screens;
- an engagement member which runs along a constant path with the other of the front and rear shutter screens; and
- electromagnetic means for shifting the displacement member to a position enabling engagement with the engagement member at an initial stage of the running for exposure and for maintaining the width of the slit greater than a predetermined value during the shutter travel.

* * * * *